United States Patent
Mirand et al.

[11] Patent Number: 6,050,175
[45] Date of Patent: Apr. 18, 2000

[54] BEVERAGE BREWING DEVICE HAVING AN INTEGRAL BEVERAGE SERVER LOCKING APPARATUS

[75] Inventors: Mauricio J. Mirand, Long Beach, Calif.; Jeffrey C. Brown, Seattle; John Tilden, Bellevue, both of Wash.; Mark Eike, Lake Forest, Calif.

[73] Assignee: BE Aerospace, Inc., Delray Beach, Fla.

[21] Appl. No.: 09/191,829

[22] Filed: Nov. 13, 1998

Related U.S. Application Data

[63] Continuation-in-part of application No. 09/025,285, Feb. 16, 1998.

[51] Int. Cl.[7] .................................................. A47J 31/00
[52] U.S. Cl. ............................ 99/279; 99/295; 99/304; 99/290
[58] Field of Search ......................... 99/275, 279, 290, 99/295, 300, 304, 306, 307, 323.3

[56] References Cited

U.S. PATENT DOCUMENTS

| | | | |
|---|---|---|---|
| 3,181,732 | 5/1965 | Immermann et al. | 99/289 R |
| 4,949,627 | 8/1990 | Nordskog | 99/281 |
| 5,183,998 | 2/1993 | Hoffman et al. | 219/492 |
| 5,704,275 | 1/1998 | Warne | 99/281 |
| 5,752,618 | 5/1998 | Trebitz et al. | 220/642 |

*Primary Examiner*—Reginald L. Alexander
*Attorney, Agent, or Firm*—Quarles & Brady LLP

[57] ABSTRACT

A beverage brewing device has an integral server locking mechanism. The beverage server (10) has top and bottom portions, (16) and (18), having first and second lips, (12) and (14), respectively. An opening in a lower server support plate (20) has a first retaining face (22) which contacts the first lip. The server support plate is preferably pivotably mounted about a pivot point (26) and biased to apply an upward force to the first end of the server. An upper server support plate (30) is positioned at the other end of the beverage server. The second support plate pivots about a second pivot point (36) and is biased downwardly, toward the first base plate. Thus, the support plates cooperate in a clamshell-like manner to secure the beverage brewing device therebetween.

13 Claims, 6 Drawing Sheets

BEVERAGE BREWING DEVICE HAVING AN INTEGRAL BEVERAGE SERVER LOCKING APPARATUS

CROSS REFERENCE TO RELATED APPLICATIONS

This application is a Continuation-In-Part (CIP) of U.S. patent application Ser. No. 09/025,285, filed Feb. 16, 1998.

STATEMENT REGARDING FEDERALLY SPONSORED RESEARCH OR DEVELOPMENT (Not applicable)

1. Technical Field

This invention relates generally to a beverage brewing device, and more particularly to a beverage brewing device for use in an aerospace environment.

2. Background of the Invention

Manufacturers of beverage brewing devices, such as coffee makers, offer a variety of device models having a number of different structural designs and features. Although particular design features vary from model to model, most beverage brewing devices have a number of common structural elements. For example, coffee makers generally include a housing, a coffee server, and a brew cup for holding coffee grinds. Furthermore, the housing typically has an internal water containment region and a space for receiving the coffee server within the housing. For most typical applications, such an arrangement is sufficient and there is no need for the provision of additional features for securing the coffee server to the housing. However, there are circumstances in which such additional securing measures are necessary. Generally, auxiliary support may be required where the beverage brewer is used under conditions which are likely to subject the device to vibrational and/or accelerative motion capable of jarring the server loose from the device housing.

For example, coffee makers on an aircraft require such additional securing measures. In particular, the various components of the brewing device which are separable from the housing, namely, the server and brew cup, must be adequately secured to prevent their intrusion into the aircraft cabin during takeoff, landing and under turbulent conditions. Known approaches for preventing such occurrences incorporate the storage of the brewing apparatus within a compartment having a lever arm which must be manually moved between a locked and a release position. The lever arm is typically opened and closed each time the beverage server is placed in, or removed from, the storage compartment, particularly when the aircraft is in flight. This approach is inefficient and may present a danger when, for example, the lever arm is in its unlocked position. In such an instance, there is a risk that the beverage server will be ejected from the storage compartment into the cabin. Furthermore, the lever arm of such conventional systems may itself present a danger, as it extends into the cabin area when unlocked and flight crew and passengers are forced to maneuver around it in a compact galley area. Under turbulent conditions, the lever arm presents a potential hazard.

For the foregoing reasons, it would be desirable to have a beverage brewing apparatus in which the beverage server and brew cup remain adequately secured to the housing, preventing their disengagement from the housing under vibrational and accelerative forces. The securing mechanism should be incorporated into the brewing apparatus itself, precluding the need for external securing means.

SUMMARY OF THE INVENTION

Briefly, according to the invention, there is provided a beverage brewing device having a beverage server locking mechanism for securing a beverage server in a server receiving portion of the device. The brewing device further comprises a brew head locking mechanism for securing a brew head in a brew head receiving portion of the device. The brew head has a gasket for securing a brew cup in the brew head when the brew head is in a locked position. The locking mechanisms prevent disengagement of the beverage server, brew head and brew cup from the device housing when the device is subjected to vibrational and accelerative forces.

The server locking mechanism comprises an engagement element having a first retaining face for engaging a lip at a first end of the beverage server. The engagement element is biased for applying a force perpendicular to the first end, urging the server toward a support structure situated adjacent to an opposing second end of the beverage server. The support structure is biased for applying a force perpendicular to the second end of the beverage server, urging the server toward the engagement element. The biasing action of the engagement element and support structure is imparted via a partially interconnected linkage system between the engagement element and the support structure, causing the biased engagement element and support structure to cooperate in a clamshell-like manner to secure the beverage server therebetween.

The brew head locking mechanism, which mechanically cooperates with the beverage server locking mechanism, comprises a pivotable latch and a pair of torsion springs. The pivotable latch is torsionally loaded by one of the torsion springs and has a stepped edge portion for engaging a fixed feature of the brewing device chassis when the device is in a latched position. A second torsion spring is attached at one end to the brew head and at an opposite end to the beverage brewing device chassis. When the brew head is in a locked position, the torsion spring rearwardly biases the brew head toward the rear of the beverage brewing device.

DETAILED DESCRIPTION OF THE PREFERRED EMBODIMENTS

While the specification concludes with claims defining the features of the invention that are regarded as novel, it is believed that the invention will be better understood from a consideration of the following description in conjunction with the drawing figures, in which like reference numerals are carried forward.

Figure 1:
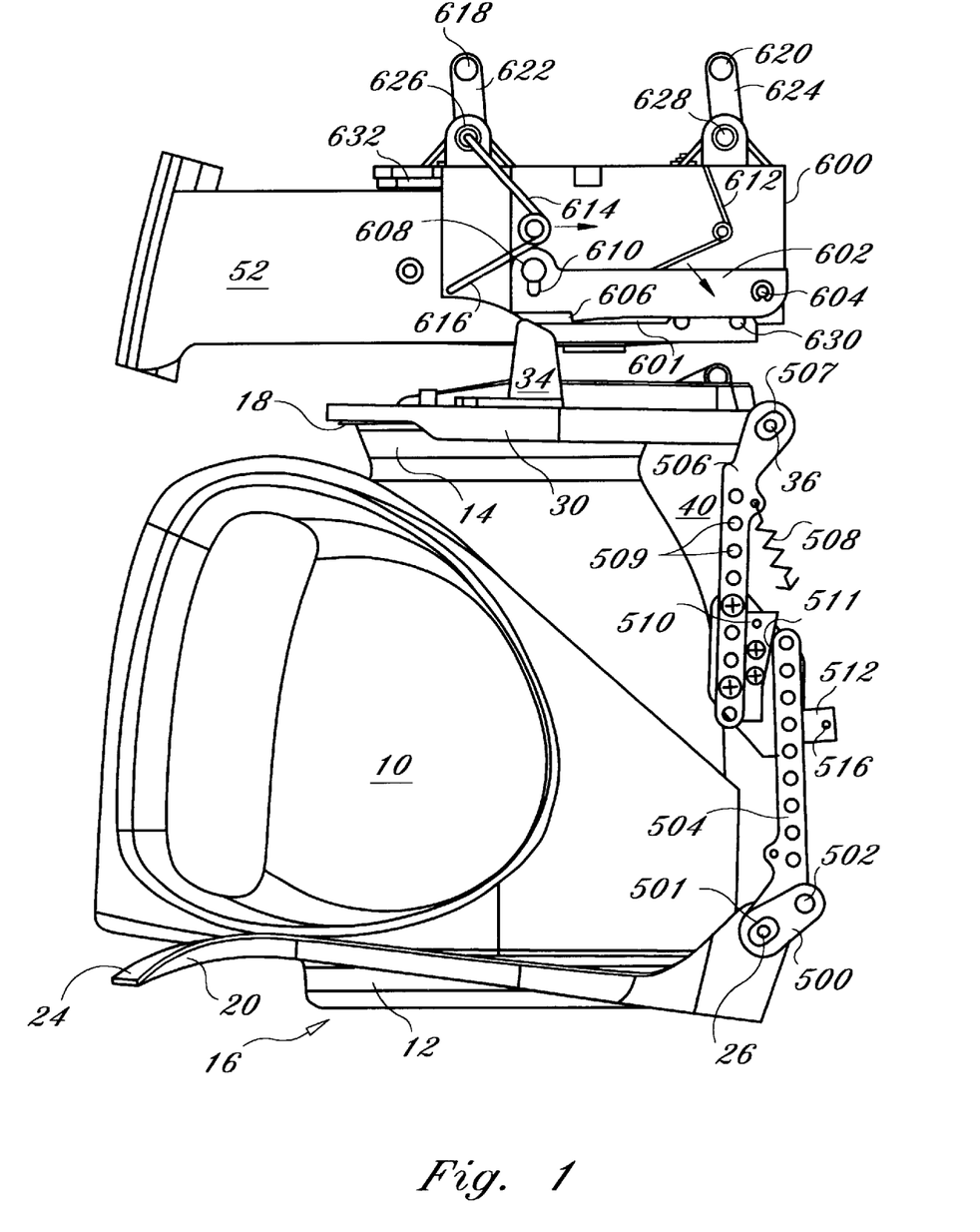
FIG. 1 is a schematic illustration showing the server and brew head assembly locking mechanisms in a locked position, in accordance with the preferred embodiment of the invention.
Figure 2:
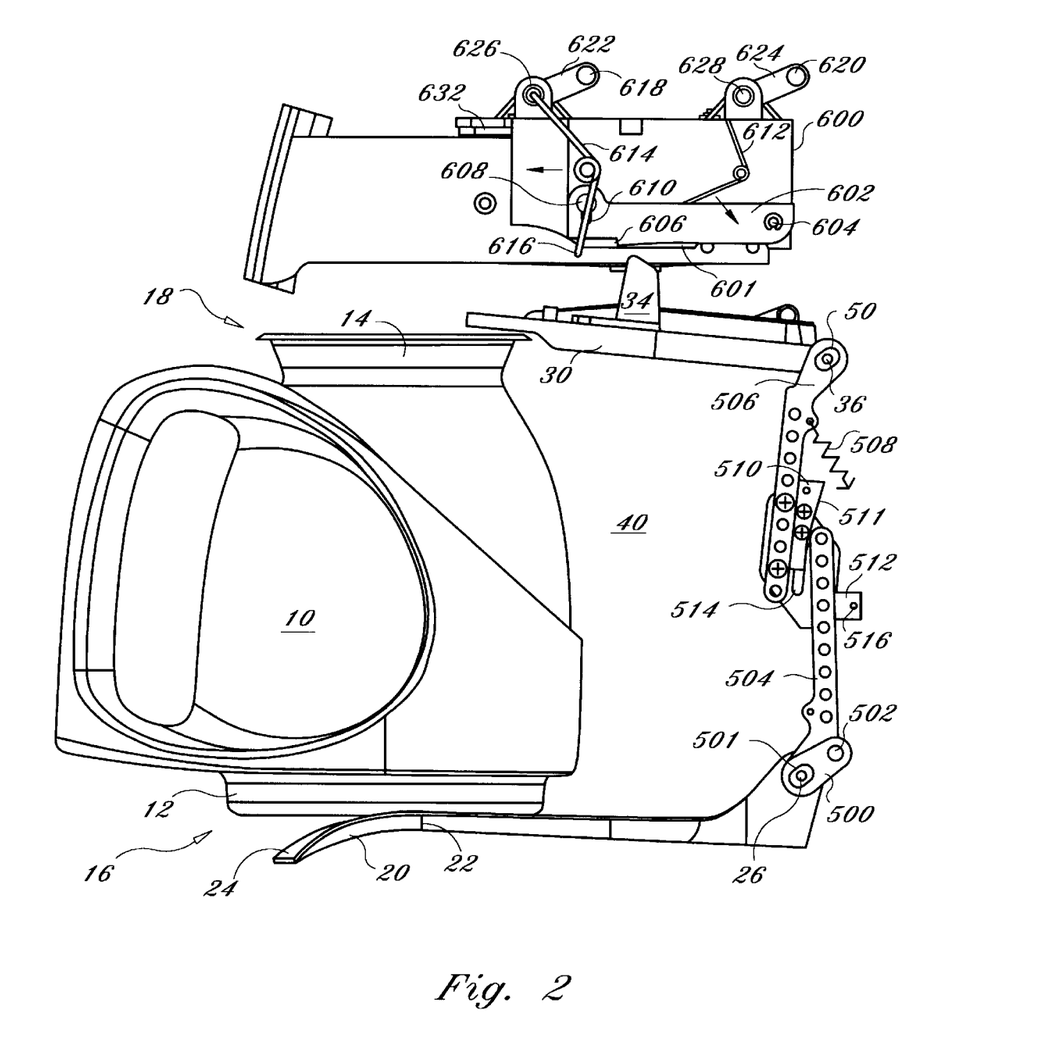
FIG. 2 is a schematic illustration showing the server and brew head assembly locking mechanisms of FIG. 1 in an unlocked position, in accordance with the preferred embodiment of the invention.

Referring now to FIGS. 1 and 2, a beverage brewing device has a server locking mechanism for securing a beverage server 10, such as a coffee pot, in a server receiving portion 40 of the device. The beverage server has first and second ends, 16 and 18, respectively. The first and second ends have first and second lips, 12 and 14, respectively. An engagement element 20 has a first retaining face 22 which contacts the periphery of the first lip 12, when the beverage server is properly secured. In a preferred embodiment, the engagement element is a metal plate having an opening for receiving the first lip. The retaining face 22 prevents the beverage server from sliding along the metal plate surface. It will occur to those skilled in the art that alternative plate structures could provide the same function. For example, a recess could be used, in lieu of an opening, for retaining the first end of the server. The engagement element 20 is preferably pivotably mounted within a housing at a pivot point 26 and is biased upwardly such that it applies a force to the first end 16 of the beverage server 10. This force urges the server toward an opposing support structure 30.

Support structure 30 is positioned adjacent to the second end 18 of the beverage server 10. The support structure is pivotably mounted to the housing at a second pivot point 36 and biased downwardly, toward the engagement element, applying a force to the second end 18 of the beverage server 10. This force urges the server toward the engagement element 20.

It may occur to one skilled in the art that a variety of methods could be employed to provide the aforementioned biasing action. However, we prefer to use a linkage system for joining engagement element 20 and support structure 30. Preferably a pair of identical linkage systems are provided on opposite sides of the beverage brewing device. However, a clear understanding of the function of the linkage system can be gained by a discussion directed to the operation of a single linkage system, as shown in the drawing figures.

Figure 3:
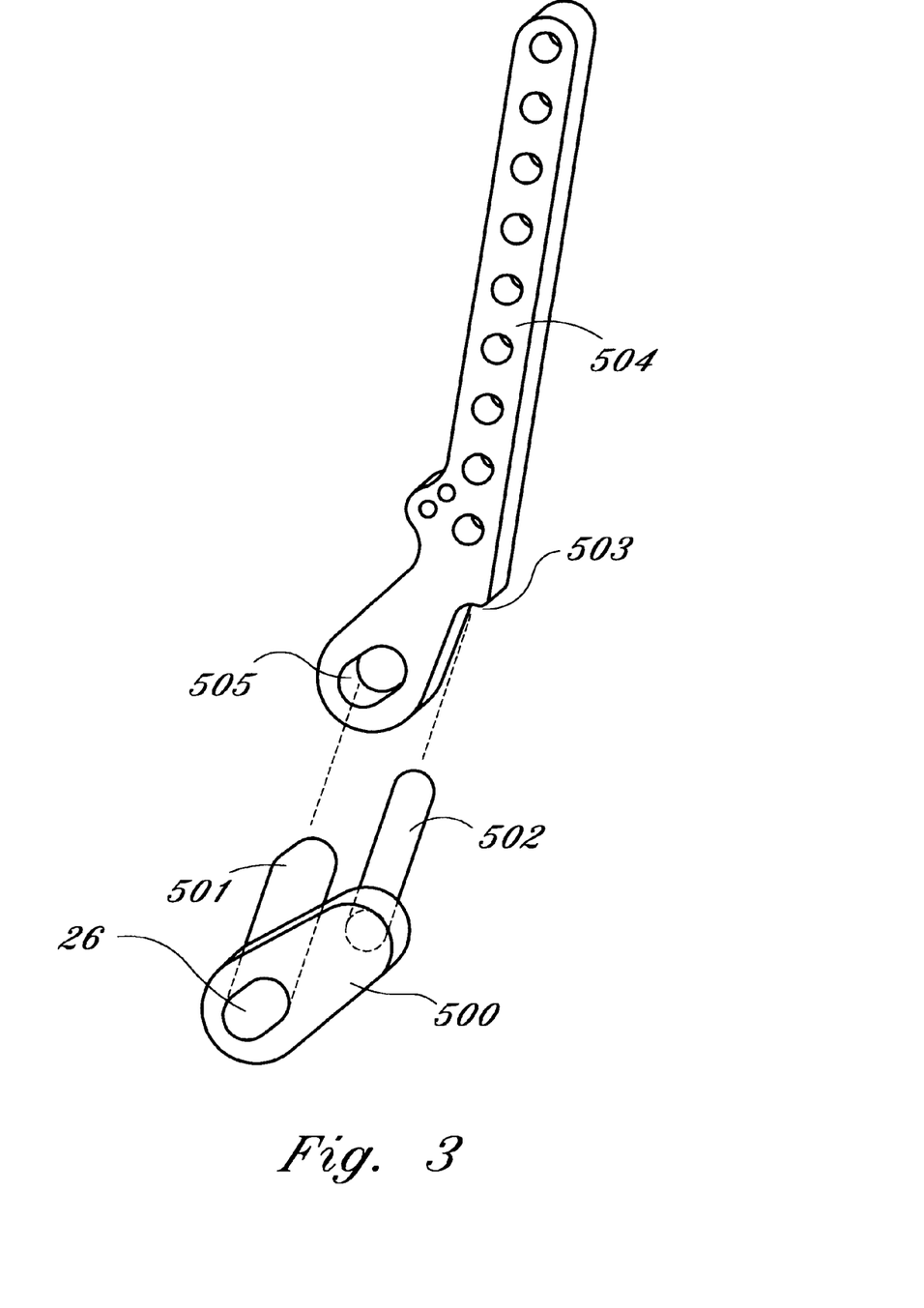
FIG. 3 is a partial exploded view of the first and second linkages, in accordance with the preferred embodiment of the invention.

Referring now to FIGS. 1–3, a first linkage 500 is provided having an opening dimensioned, or keyed, at a first end for snugly receiving non-cylindrical rod member 501 such that first linkage 500 pivots about first pivot point 26. Engagement element 20 has an opening (not shown) similarly keyed to rod member 501. Consequently, depressing engagement element 20 rotates rod member 501 in a counterclockwise direction, thereby effecting a corresponding counterclockwise rotation of first linkage 500 about first pivot point 26.

A second linkage 504 is interposed between engagement element 20 and first linkage 500. As illustrated in FIG. 3, second linkage 504 has a circular opening dimensioned to partially engage the outer surface of rod member 501, but is not keyed to the rod. In this manner, rotation of second linkage 504 about pivot point 26 is not inhibited by rod member 501. Conversely, rotation of rod member 501 does not directly effect a corresponding rotation of second linkage 504. However, rotation of rod member 501 indirectly effects rotation of second linkage 504 about pivot point 26. More specifically, a nub 502 extending inwardly (i.e., toward second member 504) from a second end of first linkage 500 is configured for engaging an indentation 503 formed in the first end of second linkage 504. As first linkage 500 is rotated in a counterclockwise direction about first pivot point 26, nub 502 engages indentation 503 to effect the counterclockwise rotation of second member 504 about first pivot point 26.

A third linkage 506 is provided having an opening at a first end dimensioned for snugly receiving non-cylindrical rod member 507 such that rotation of rod member 507 causes third linkage 506 to pivot about second pivot point 36. Support structure 30 has an opening (not shown) similarly keyed to rod member 507, such that counterclockwise rotation of third linkage 506 about second pivot point 36 urges support structure 30 in a downward direction. Second and third linkages 504 and 506 cooperate via plate member 512 and wedge member 510.

Figure 4:
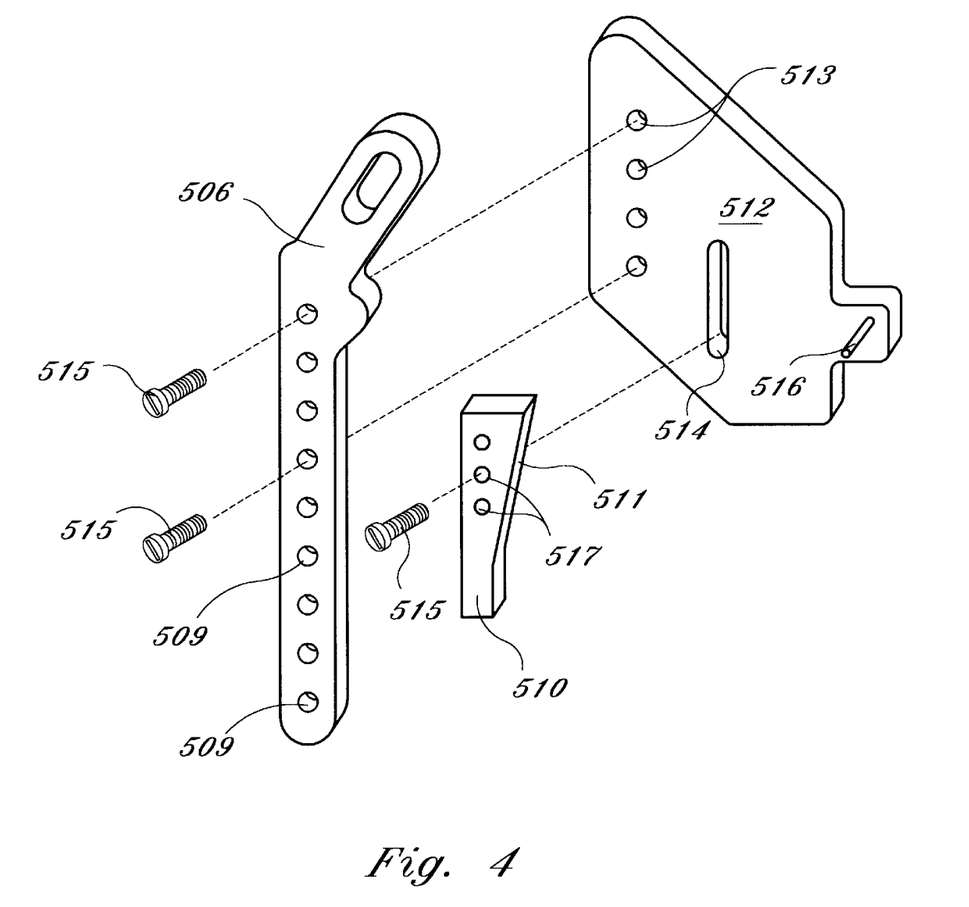
FIG. 4 is a partial exploded view of the third linkage, wedge member and plate member of the present invention.

Referring now to FIG. 4, third linkage 506 and wedge member 510 are secured to plate member 512. Although various means of attachment are possible, it is preferred that third linkage 506 and wedge member 510 are attached to plate member 512 using conventional fasteners, such as screws, bolts and the like. Third linkage 506 and wedge member 510 are provided having apertures for receiving fasteners 515. The apertures 509 in third linkage 506 align with corresponding apertures 513 in plate member 512, while the apertures 517 in wedge member 510 align with plate member slot 514. In this manner, very subtle adjustments in the vertical position of wedge member 510 can be made with respect to plate member 512.

Referring now to FIGS. 1–4, a second end of second linkage 504 slidably engages both wedge member 510 and plate member 512, but is not secured to either of said members. Movement of second linkage 504 with respect to plate member 512 is restricted by angled surface 511 of wedge member 510 and plate member integral stop mechanism 516. Third linkage 506 is provided biased in a counterclockwise direction about second pivot point 36. Preferably, this biasing action is provided by an extension spring 508 attached at one end to an upper portion of third linkage 506 and at a second end to the beverage brewing device chassis.

Referring now to FIG. 1, the individual components of the beverage server locking mechanism cooperate to secure beverage server 10 within beverage server receiving portion 40 when the beverage brewing device is in a locked position. In this locked position, extension spring 508 biases third linkage 506 in a counterclockwise direction about second pivot point 36, imparting a corresponding counterclockwise bias of support structure 30 about pivot point 36. As a result of this biasing action, support structure 30 is urged in a downward direction against top end 18 of beverage server 10. Simultaneously, the counterclockwise bias on third linkage 506 urges plate member 512 and, consequently, wedge member 510 to the right (i.e., toward the rear of the beverage brewing device).

The bias on plate member 512 causes sloped edge 511 of wedge member 512 to impart a force against the second end of second linkage 504, resulting in a clockwise rotational bias of second linkage 504 about first pivot point 26. Consequently, second linkage 504 imparts a clockwise rotational bias, via nub 502, on first linkage 500. The clockwise rotation of first linkage 500 causes a corresponding clockwise rotation of rod member 501, thereby biasing engagement member 20 in an upward direction and urging beverage server 10 toward support structure 30.

Referring now to FIGS. 2 and 3, the individual components of the beverage server locking mechanism cooperate to enable the release of beverage server 10 from beverage server receiving portion 40, when release portion 24 of engagement element 20 is depressed. Depressing release portion 24 causes the counterclockwise rotation of rod member 501, thereby effecting a counterclockwise rotation of first linkage 500 about first pivot point 26. As first linkage 500 rotates, nub 502 imparts a generally upward force on second linkage 504 at indentation 503. Consequently, the second end of second linkage 504 slidably engages wedge member 510, imparting a force upon sloped surface 511. As the second end of second linkage 504 slides in an upward direction against sloped surface 511, the magnitude of the rotation of third linkage 506 and support structure 30 about pivot point 36 increases. Consequently, the degree to which support structure 30 opens can be modified by adjusting the vertical position of wedge member 510 on plate member 512. For instance, where it is desirable to increase the degree to which support structure 30 opens, the vertical position of wedge member 510 on plate member 512 can be lowered such that second linkage 504 engages a higher portion of edge 511. Through this novel linkage system, support structure 30 is urged in an upward direction by simply depressing engagement element 20. Accordingly, engagement element 20 and support structure 30 open up in a clamshell-like manner to allow beverage server 10 to be pulled out of beverage server receiving portion 40.

The beverage brewing device also includes a brew cup 52 for holding a product to be brewed (e.g., coffee grinds), and a brew head 600 for covering the brew cup. Brew head 600 is pivotably attached to the device chassis by fourth and fifth linkages, 622 and 624, respectively. Fourth linkage 622 is attached to the chassis at fourth pivot point 618 and supports the brew head at point 626. Fifth linkage 624 is attached to the chassis at fifth pivot point 620 and supports the brew head at point 628. As fourth and fifth linkages 618 and 620 are pivoted in a clockwise direction about pivot points 618 and 620, brew head 600 swings in an upward and outward direction (i.e., toward the front of the beverage brewing device) along a path defined by the rotation of the linkages. Brew cup 52 is supported on rails (not shown) extending inwardly from opposing sides of the brewing device chassis, allowing the brew cup to be slidably inserted into, and removed from, the device. Brew cup 52 and brew head 600 cooperate with one another in a manner which will now be described.

Figure 5:
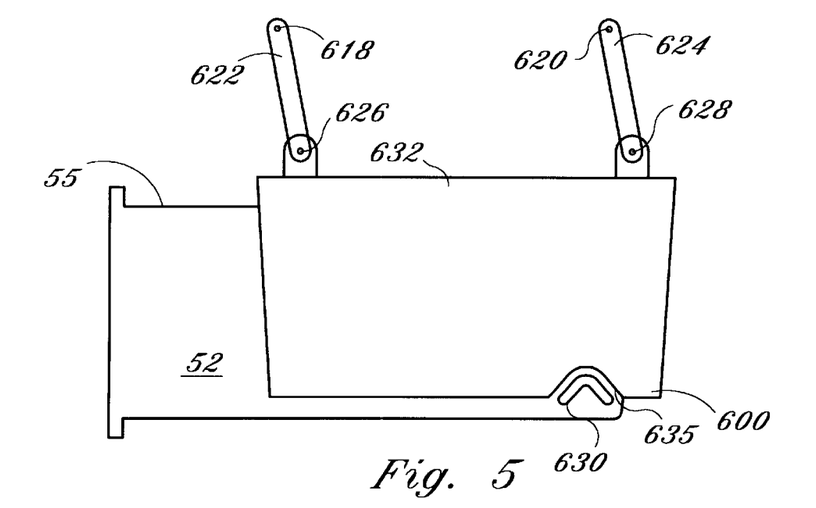
FIG. 5 is a schematic illustration showing the brew head in a locked position.
Figure 6:
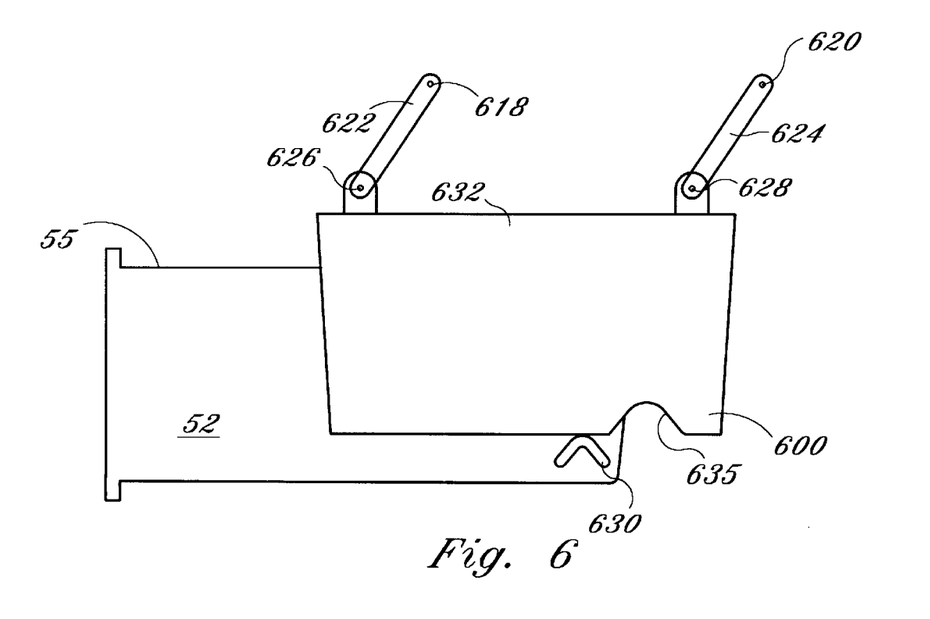
FIG. 6 is a schematic illustration showing the brew head in an unlocked position.
Figure 7:
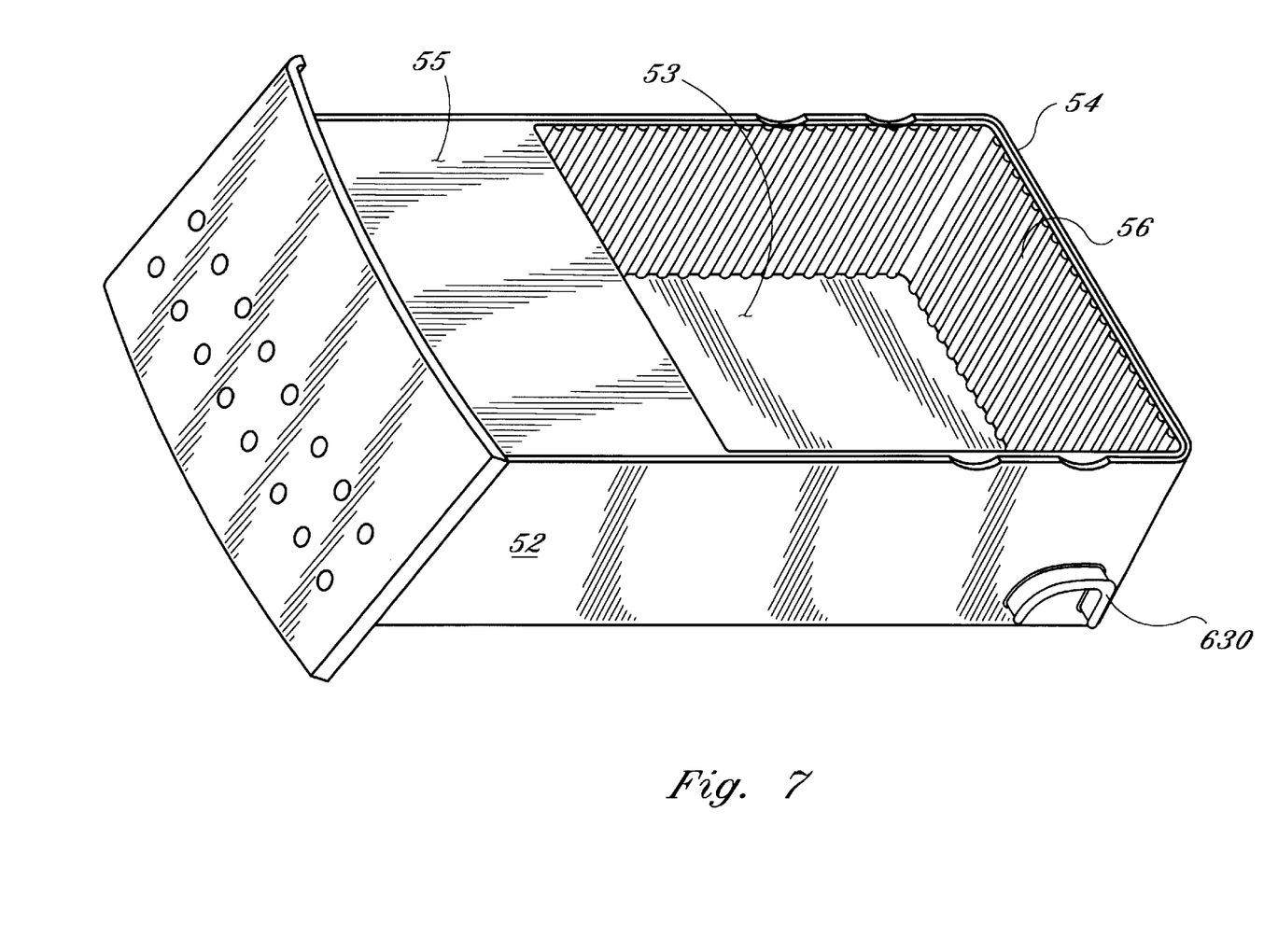
FIG. 7 is a perspective view of a brew cup in accordance with the present invention.

Referring now to FIGS. 5–8, brew cup 52 has a cavity 53 adapted for holding a product to be brewed. For instance, where the device is used to brew coffee, cavity 53 may hold coffee grinds or coffee filter packages. In FIG. 5, the brew head 600 is shown in a locked position. In this locked position, brew cup 52 is fully inserted into the beverage brewing device, and a gasket 632 extends downward from a lower surface of brew head 600 toward brew cup cavity 53. The gasket 632 has an area which substantially covers the lower surface of the brew head and covers a larger area than that defined by the perimeter of cavity 53. Consequently, when the brew head is in a locked position, gasket 632 forms a seal along edges 54 and surface 55 of the brew cup. Water for brewing is introduced into cavity 53 through an opening 631 extending through a center cone portion 633 of gasket 632. In FIGS. 5 and 6, the outlines of cavity 53 and gasket 632 are depicted by dotted lines.

A raised feature 630 is formed on at least one side of brew cup 52. When the brew cup is fully inserted into the beverage brewing device, such that the brew head is in a locked position, raised feature 630 is positioned directly beneath an indentation 635 formed along the lower edge of a side of the brew head. As brew cup 52 is slidably removed from the beverage brewing device, raised feature 630 on the side of brew cup 52 engages brew head indentation 635, forcing the brew head 600 to travel in a path defined by the pivoting motion of fourth and fifth linkages 622 and 624. In a manner hereinafter described, a brew head locking mechanism maintains the brew head in an unlocked position until the brew cup 52 is subsequently reinserted into the beverage brewing device. As illustrated in FIG. 6, brew head 600 may be pivoted beyond its unlocked position as brew cup fixed feature 630 slides along the lower edge of the side of the brew head, allowing brew cup 52 to be completely removed from the brewing device. Once brew cup fixed feature 630 has been slidably moved beyond the lower edge of the side of brew head 600, the brew head pivots back to its unlocked position.

Referring now to FIG. 1, the brew head locking mechanism includes a downwardly-biased latch member 602, and a first torsion spring 614. In the preferred embodiment of the present invention, the downward bias on latch member 602 is provided by a second torsion spring 612. A first end of latch member 602 is pivotably secured to the side of brew head 600 at third pivot point 604. A second end, opposite the first end of latch member 602, is configured for providing restricted rotational movement of latch member 602 about third pivot point 604. Preferably, this restricted rotational motion is defined by slot 610, formed in the second end of latch member 602, which engages a fixed feature 608 on an outer surface of the brew head 600. Latch member 602 also has a stepped edge portion 606 adapted for engaging a fixed feature (not shown) of the brewing device chassis when the brew head and brew cup are in a locked position. With the stepped edge portion 606 engaging the fixed feature of the brewing device chassis, brew head 600 is prevented from pivoting toward the front of the beverage brewing device. The brew head is further maintained in the locked position via the biasing action of a first torsion spring 614, fixed at a first end 616 to the beverage brewing device chassis and at a second end to point 626 of the brew head 600. As illustrated in FIG. 1, when the brew head is in a locked position, first torsion spring 614 biases brew head 600 to the right (i.e., toward the rear of the beverage brewing device). In this locked position, the brew cup 52 is prevented from being slidably removed from the beverage brewing device by an integral stop mechanism 634 formed in gasket 632.

Referring now to FIGS. 2 and 6, the beverage server and brew head are simultaneously unlocked by depressing release portion 24 of engagement element 20. Depressing release portion 24 effects upward movement of support structure 30. As support element 30 is opened, latch contact member 34 engages latch member 602, causing latch member 602 to pivot in a clockwise direction about third pivot point 604, thereby disengaging stepped edge portion 606 from the fixed feature (not shown) of the device chassis. With latch member 602 disengaged, brew head 600, which is still biased in a locked position by torsion spring 614, is pivoted into an unlocked position as brew cup 52 is pulled out of the beverage brewing device.

As brew cup 52 is slidably removed from brew head 600, fixed feature 630 on the side of brew cup 52 engages brew head indentation 635 in the manner previously described. This engagement drives brew head 600 in a forward and upward direction along a path defined by the clockwise rotation of fourth and fifth linkages 622 and 624 about fourth and fifth pivot points 618 and 620. The upward movement of brew head 600 enables brew cup 52 to be removed without interference from gasket stop mechanism 634. Furthermore, as first torsion spring 614 reaches a critical position, referred to in the art as being "over-center", its bias on brew head 600 is reversed and brew head 600 is maintained in this unlocked position, enabling access to brew cup cavity 53. In this unlocked position, brew cup 52 can be completely removed from the beverage brewing device.

The manner in which the beverage server and brew head locking mechanisms are reestablished in a locked position will now be described. Initially, the user depresses release portion 24 of engagement element 20, causing engagement element 20 and support structure 30 to open up in a clamshell-like manner to enable beverage server 10 to be reinserted into beverage brewing device receiving area 40. Subsequently, the user releases engagement element 20, allowing the beverage server locking mechanism to secure server 10 between engagement element 20 and support structure 30.

Reestablishing brew cup 52 and brew head 600 in a locked position requires simply slidably reinserting brew cup 52 into the beverage brewing device. As a user slidably reinserts brew cup 52 along the chassis side rails, its rear wall 56 engages the brew head 600, driving it in a rear downward direction defined by the travel of fourth and fifth linkages 622 and 624. Preferably, brew cup 52 engages a rear surface (not shown) of brew head 600; however, other engagement mechanisms are possible. For instance, where brew head 600 is provided without a rear surface, integral features extending inwardly from brew head side walls may be provided as contact points. Upon passing through its critical "over-center" position, the bias imparted by first torsion spring 614 on brew head 600 is again reversed and brew head 600 is biased into its locked position. Furthermore, as the brew head is being rearwardly forced into the beverage brewing device, the latch member 602 reengages the fixed chassis feature (not shown). More specifically, the lower edge 601 of latch member 602 slides along, and is upwardly biased by, the fixed chassis feature as the brew head travels toward the rear of the device. As stepped edge portion 606 passes over the fixed feature, the latch member snaps downward due to the bias of spring 612.

What is claimed is:

1. A beverage brewing device having a beverage server locking mechanism for securing a beverage server within a server receiving portion of said beverage brewing device, the beverage brewing device having a chassis, the beverage server locking mechanism comprising:
    an engagement element configured for engaging a first lip formed on a first end of said beverage server, said engagement element pivotable about a first pivot point;
    a support structure situated adjacent to an opposing second end of said beverage server, said support structure pivotable about a second pivot point;
    a first linkage having first and second ends, the first end secured to and pivotable about said first pivot point;
    a second linkage having first and second ends, the first end pivotable about said first pivot point and adapted for engagement with the second end of said first linkage; and
    a third linkage having first and second ends, the first end pivotable about said second pivot point, whereby said third linkage is rotationally biased about the second pivot point,
        said rotational bias effecting a corresponding rotational bias of said first and second linkages about the first pivot point, such that said engagement element and said support structure are biased toward one another.

2. A beverage brewing device as recited in claim 1, further comprising an adjustable linkage adapted for communicating a force between said second and third linkages.

3. A beverage brewing device as recited in claim 2, wherein said adjustable linkage comprises a plate member secured to the second end of said third linkage, and a vertically-adjustable wedge member secured to said plate member.

4. A beverage brewing device as recited in claim 3, wherein said vertically-adjustable wedge member is interposed between the second end of said second linkage and the second end of said third linkage.

5. A beverage brewing device as recited in claim 3, wherein said wedge member has a sloped edge for slidably engaging the second end of said second linkage.

6. A beverage brewing device as recited in claim 1, further comprising a brew head adapted for engaging a brew cup.

7. A beverage brewing device as recited in claim 6, further comprising:
    a pivoting means for moving said brew head between a locked position and an unlocked position; and
    a brew head locking means adapted for maintaining said brew head in said locked and unlocked positions.

8. A beverage brewing device as recited in claim 7, wherein said pivoting means comprises:
    a fourth linkage having a first end pivotably secured to a fourth pivot point on said device chassis and a second end pivotably secured to said brew head; and
    a fifth linkage having a first end pivotably secured to a fifth pivot point on said device chassis and a second end pivotably secured to said brew head.

9. A beverage brewing device as recited in claim 7, wherein said brew head locking means comprises an overcenter-biased torsion spring having a first end attached to said brew head and a second end attached to said device chassis.

10. A beverage brewing device as recited in claim 9, further comprising a downwardly-biased latch member having first and second ends, the first end pivotably secured to an exterior surface of said brew head, and the second end adapted for engaging a fixed feature of said beverage brewing device chassis.

11. A beverage brewing device as recited in claim 10, wherein the downward bias on said latch member is provided by a torsion spring having a first end attached to said brew head, and a second end contacting an upper edge of said latch member.

12. A beverage brewing device as recited in claim 6, further comprising a gasket attached to an upper internal surface of said brew head, said gasket having at least one integral stop mechanism for preventing said brew cup from being slidably removed from said brew head when said brew head is in a locked position.

13. A beverage brewing device as recited in claim 12, further comprising a raised feature formed on an outer surface of said brew cup and adapted for slidably engaging a lower edge of said brew head, whereby said raised feature urges said brew head upwards and away from said brew cup as said brew cup is being slidably removed from said beverage brewing device.

* * * * *